(12) United States Patent
Tal et al.

(10) Patent No.: US 12,547,439 B2
(45) Date of Patent: Feb. 10, 2026

(54) INPUT-OUTPUT PROCESSING IN SOFTWARE-DEFINED STORAGE SYSTEMS

(71) Applicant: Dell Products L.P., Round Rock, TX (US)

(72) Inventors: Doron Tal, Geva Carmel (IL); Adnan Sahin, Needham, MA (US)

(73) Assignee: Dell Products L.P., Round Rock, TX (US)

( * ) Notice: Subject to any disclaimer, the term of this patent is extended or adjusted under 35 U.S.C. 154(b) by 604 days.

(21) Appl. No.: 17/954,886

(22) Filed: Sep. 28, 2022

(65) Prior Publication Data

US 2024/0103898 A1    Mar. 28, 2024

(51) Int. Cl.
*G06F 9/455*    (2018.01)
*G06F 12/0875*    (2016.01)

(52) U.S. Cl.
CPC ...... *G06F 9/45558* (2013.01); *G06F 12/0875* (2013.01); *G06F 2009/45579* (2013.01); *G06F 2009/45583* (2013.01); *G06F 2212/45* (2013.01)

(58) Field of Classification Search
CPC ............ G06F 12/0868; G06F 12/0875; G06F 9/45558; G06F 2212/45; G06F 2212/154; G06F 2009/45583; G06F 2009/45579
USPC .......................................................... 710/6
See application file for complete search history.

(56) References Cited

U.S. PATENT DOCUMENTS

| | | | |
|---|---|---|---|
| 8,046,551 B1 | 10/2011 | Sahin | |
| 10,025,719 B2* | 7/2018 | Takeda | G06F 12/1009 |
| 2013/0326156 A1* | 12/2013 | Cui | H04L 67/568 |
| | | | 711/144 |
| 2016/0371192 A1* | 12/2016 | Lin | G06F 3/0604 |
| 2021/0303480 A1* | 9/2021 | Keller | G06F 12/0824 |
| 2023/0048306 A1* | 2/2023 | Roque | G06F 9/5072 |

OTHER PUBLICATIONS

Amazon Web Services, "Cloud Object Storage—Amazon S3," https://aws.amazon.com/s3/, Accessed Sep. 28, 2022, 6 pages.
Amazon Web Services, "EC2," https://aws.amazon.com/pm/ec2/, Accessed Sep. 28, 2022, 5 pages.

(Continued)

*Primary Examiner* — Chun Kuan Lee
(74) *Attorney, Agent, or Firm* — Ryan, Mason & Lewis, LLP

(57) ABSTRACT

An apparatus comprises a processing device configured to receive, from one of two or more storage nodes of a software-defined storage system comprising a write cache and persistent storage, a request to read a given portion of data. One or more portions of data in the persistent storage are also stored as read-only data in local storage of virtual computing instances implementing the storage nodes. The processing device is configured to read the given portion of data from the local storage of the virtual computing instances responsive to determining that the given portion of data is part of the read-only data in the local storage of the virtual computing instances, and to read the given portion of data from the write cache or persistent storage responsive to determining that the given portion of data is not part of the read-only data in the local storage of the virtual computing instances.

20 Claims, 7 Drawing Sheets

(56) References Cited

OTHER PUBLICATIONS

Amazon Web Services, "High-Performance Block Storage—Amazon EBS," https://aws.amazon.com/ebs/, Accessed Sep. 28, 2022, 6 pages.
Dell Technologies, "Dell PowerFlex," Specification Sheet, Aug. 2022, 7 pages.
Dell Technologies, "Dell EMC PowerFlex Software-Defined Storage for Modern Datacenters," Solution Brief, Jun. 2020, 3 pages.
Dell Technologies, "Dell PowerFlex Unbounded Software-defined Infrastructure for the Modern Enterprise," Solution Brief, Aug. 2022, 2 pages.

* cited by examiner

INPUT-OUTPUT PROCESSING IN SOFTWARE-DEFINED STORAGE SYSTEMS

FIELD

The field relates generally to information processing, and more particularly to storage in information processing systems.

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other feature requirements may be most important. There is thus a need for techniques which enable a storage system to offer flexibility in storage offerings for workloads with different performance and feature requirements.

SUMMARY

Illustrative embodiments of the present disclosure provide techniques for input-output processing in software-defined storage systems.

In one embodiment, an apparatus comprises at least one processing device comprising a processor coupled to a memory. The at least one processing device is configured to perform the step of receiving, from one of two or more storage nodes of a software-defined storage system, a read input-output request to read a given portion of data, the software-defined storage system comprising a write cache and persistent storage, the two or more storage nodes being implemented as respective virtual computing instances having local storage, wherein one or more portions of data stored in the persistent storage of the software-defined storage system are also stored as read-only data in the local storage of the virtual computing instances. The at least one processing device is also configured to perform the step of determining whether the given portion of data is part of the one or more portions of the data stored in the persistent storage of the software-defined storage system that are also stored as read-only data in the local storage of the virtual computing instances. The at least one processing device is further configured to perform the step of, responsive to determining that the given portion of data is part of the one or more portions of the data stored in the persistent storage of the software-defined storage system that are also stored as read-only data in the local storage of the virtual computing instances, reading the given portion of data from the local storage of the virtual computing instances. The at least one processing device is further configured to perform the step of, responsive to determining that the given portion of data is not part of the one or more portions of the data stored in the persistent storage of the software-defined storage system that are also stored as read-only data in the local storage of the virtual computing instances, reading the given portion of data from at least one of the write cache and the persistent storage of the software-defined storage system.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
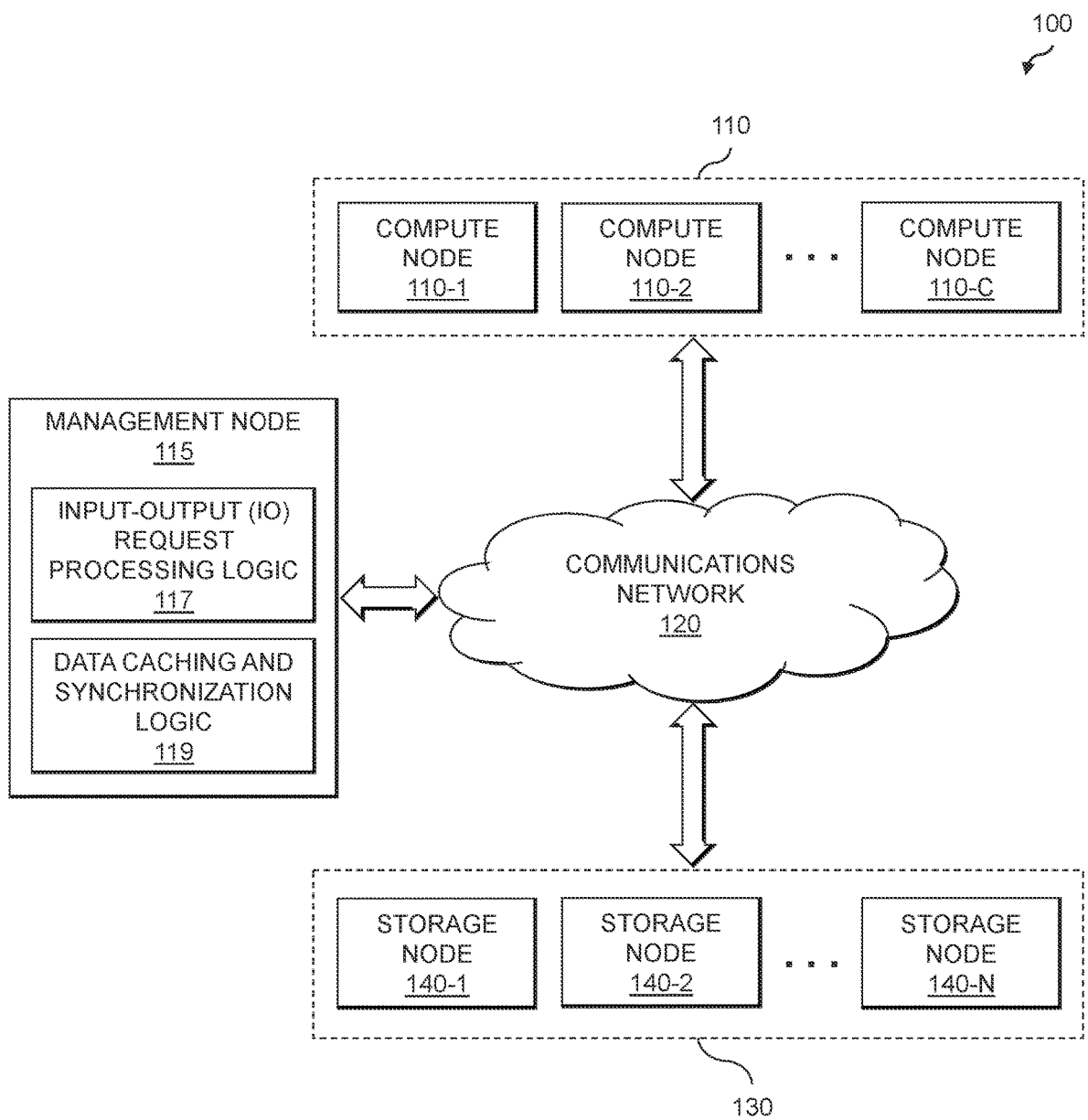
FIGS. 1A and 1B schematically illustrate an information processing system comprising a storage system configured for input-output processing utilizing software-defined storage resources in an illustrative embodiment.
Figure 1B:
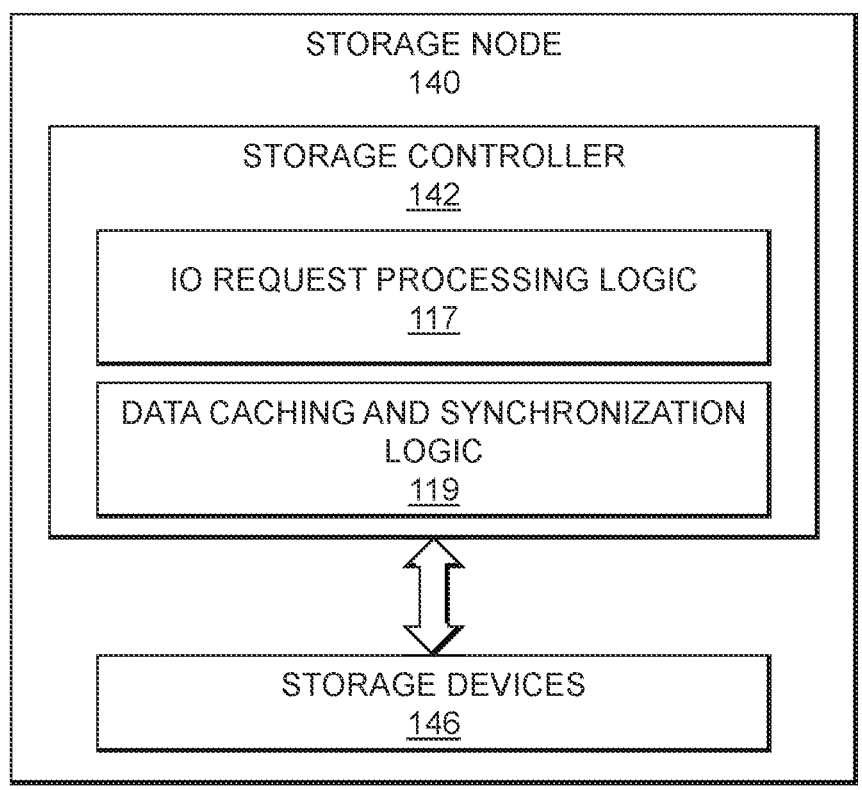

FIGS. 1A and 1B schematically illustrate an information processing system which is configured for optimizing or improving input-output (IO) processing utilizing software-defined storage (SDS) resources according to an exemplary embodiment of the disclosure. More specifically, FIG. 1A schematically illustrates an information processing system 100 which comprises a plurality of compute nodes 110-1, 110-2, ..., 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, ..., 140-N (collectively referred to as storage nodes 140, or each singularly referred to as a storage node 140). In the context of the exemplary embodiments described herein, the management nodes 115 and the data storage system 130 implement IO request processing logic 117 and data caching and synchronization logic 119 supporting optimization or improvement of IO processing in the data storage system 130 utilizing SDS resources. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement IO request processing logic 117 and data caching and synchronization logic 119 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the IO request processing logic 117 and the data caching and synchronization logic 119 may be implemented at least in part within the one or more management nodes 115 as well as in one or more of the storage nodes 140 of the data storage system 130. This may include implementing different portions of the IO request processing logic 117 and the data caching and synchronization logic 119 functionality described herein being implemented within the management nodes 115 and the storage nodes 140. In other embodiments, however, the IO request processing logic 117 and the data caching and synchronization logic 119 may be implemented entirely within the management nodes 115 or entirely within the storage nodes 140. In still other embodiments, at least a portion of the functionality of the IO request processing logic 117 and the data caching and synchronization logic 119 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such as non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control IO access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various function as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

Illustrative embodiments provide functionality for optimizing or improving performance of IO request processing in SDS infrastructure. Data storage system 130, as an example, may be configured to support different types of storage services (e.g., SDS services) having different characteristics (e.g., cost, performance, availability, etc.). By way of example, the above-described "device tiering" may be used to provide different storage tiers with different characteristics (e.g., "fast" devices which are relatively expensive and "slow" devices which are relatively inexpensive). In some embodiments, the compute nodes 110 and/or storage nodes 140 are assumed to comprise virtual computing resources such as VMs or containers, which are instantiated with associated local storage. The local storage of such virtual computing resources used to implement the compute nodes 110 and/or storage nodes 140 is ephemeral, in that the local storage is lost when the virtual computing resources are shut down. To optimize or improve the processing of IO requests, the IO request processing logic 117 is configured to intelligently utilize the local storage of the virtual computing resources implementing the compute nodes 110 and/or storage nodes 140 as an ephemeral read cache that is separate from other storage services providing a write cache and backend persistent storage. When data is available in the ephemeral read cache (e.g., the local storage of the virtual computing resource implementing the compute nodes 110 and/or storage nodes 140), the IO request processing logic 117 directs read requests to the ephemeral read cache. When data is not available in the ephemeral read cache, the IO request processing logic 117 directs read requests to a write cache and/or backend persistent storage in the data storage system 130. In some embodiments, the write cache is implemented using higher performance storage resources (e.g., the "fast" device tier) and the backend persistent storage is implemented using relatively lower performance storage resources (e.g., the "slow" device tier).

The data caching and synchronization logic 119 is configured to synchronize data to the ephemeral read cache (e.g., the local storage of the virtual computing resource implementing the compute nodes 110 and/or storage nodes 140). Such synchronization may be performed between the backend persistent storage, or from the write cache. For example, when write requests are processed by the IO request processing logic 117, data in the write cache may be changed. This triggers the data caching and synchronization logic 119 to synchronize or update the backend persistent storage, and to invalidate any contents of the ephemeral read cache that are affected by the write requests. The data caching and synchronization logic 119 may further synchronize the written data to the ephemeral read cache (e.g., from the write cache, or from the backend persistent storage).

An exemplary process for IO processing utilizing SDS resources will now be described in more detail with reference to the flow diagram of FIG. 2. It is to be understood that this particular process is only an example, and that additional or alternative processes for IO processing utilizing SDS resources may be used in other embodiments.

In this embodiment, the process includes steps 200 through 206. These steps are assumed to be performed using the IO request processing logic 117 and the data caching and synchronization logic 119, which as noted above may be implemented in the management nodes 115 of system 100, in storage nodes 140 of the data storage system 130 of system 100, in compute nodes 110 of system 100, combinations thereof, etc. The process begins with step 200, receiving from one of two or more storage nodes (e.g., compute nodes 110 and/or storage nodes 140) of a SDS system, a read IO request to read a given portion of data. The SDS system comprises a write cache and persistent storage, and the two or more storage nodes are implemented as respective virtual computing instances having local storage. One or more portions of data stored in the persistent storage of the SDS system are also stored as read-only data in the local storage of the virtual computing instances. At least one of the virtual computing instances comprises at least one of a VM and a software container. The local storage of the virtual computing instances comprises ephemeral storage that does not persist when the virtual computing instances are shut down.

The write cache is implemented utilizing a first type of SDS resources providing a first performance level, and the persistent storage is implemented utilizing a second type of SDS resources providing a second performance level, wherein the second performance level is lower than the first performance level. The local storage of the virtual computing instances may be implemented utilizing a third type of SDS resources providing a third performance level, the third performance level being higher than the first and second performance levels. In some embodiments, the write cache is implemented utilizing cloud-based block storage, and the persistent storage is implemented utilizing cloud-based object storage. The local storage of the virtual computing instances may be implemented utilizing cloud-based block storage with a lower latency than the cloud-based block storage used for implementing the write cache.

In step 202, a determination is made as to whether the given portion of data (e.g., that is the subject of the received read IO request) is part of the one or more portions of the data stored in the persistent storage of the SDS system that are also stored as read-only data in the local storage of the virtual computing instances. The given portion of data is read from the local storage of the virtual computing instances in step 204 responsive to determining that the given portion of data is part of the one or more portions of the data stored in the persistent storage of the SDS system that are also stored as read-only data in the local storage of the virtual computing instances. The given portion of data is read from at least one of the write cache and the persistent storage of the SDS system in step 206 responsive to determining that the given portion of data is not part of the one or more portions of the data stored in the persistent storage of the SDS system that are also stored as read-only data in the local storage of the virtual computing instances.

Figure 2:
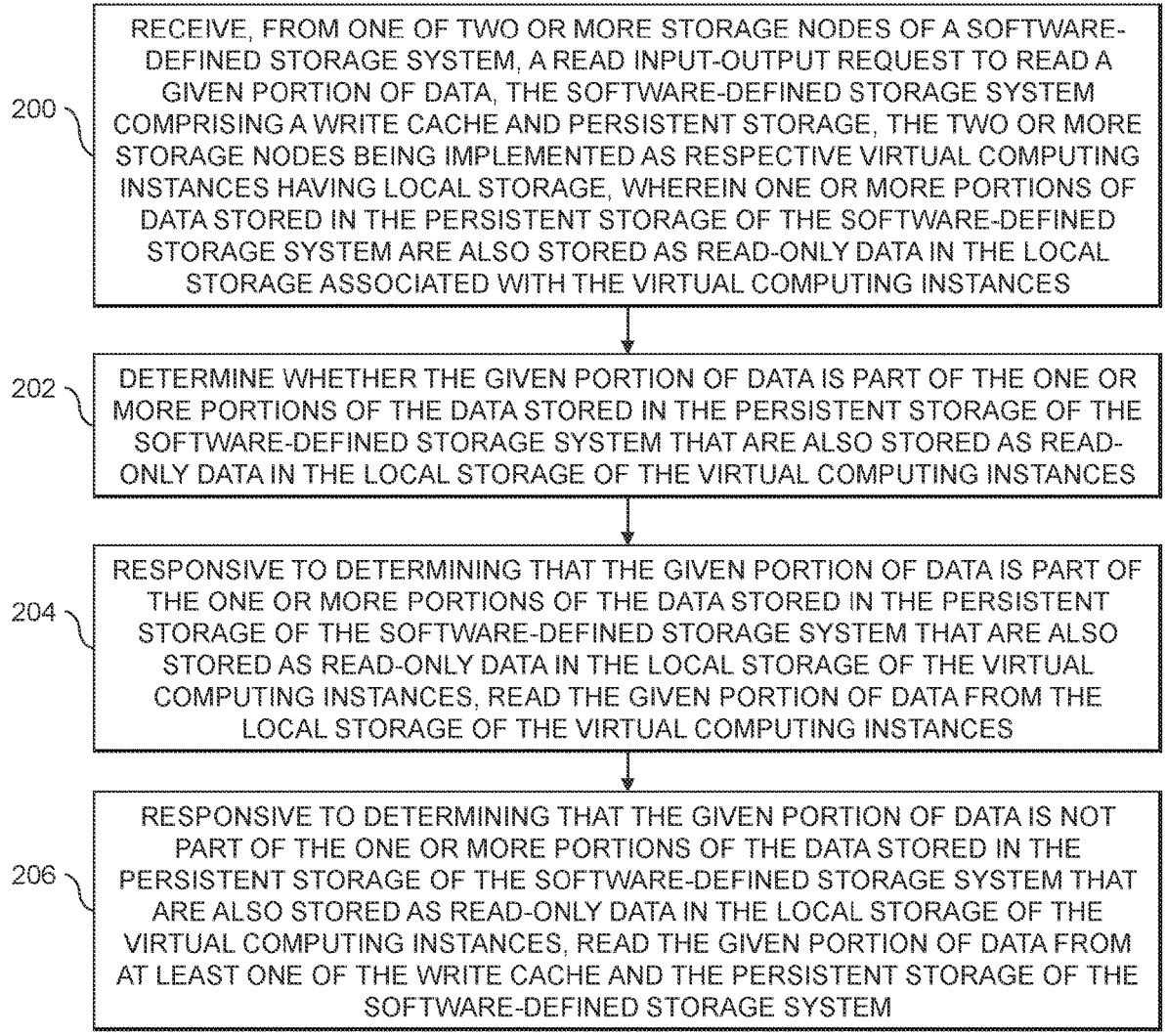
FIG. 2 is a flow diagram of an exemplary process for input-output processing utilizing software-defined storage resources in an illustrative embodiment.

The FIG. 2 process may also include synchronizing, in a background process, the one or more portions of the data stored in the persistent storage of the SDS system with the read-only data in the local storage of the virtual computing instances.

In some embodiments, the FIG. 2 process further includes receiving, from one of the two or more storage nodes of the SDS system, a write IO request to write new data. Responsive to writing the new data to the write cache of the SDS system, the FIG. 2 process may include at least one of: invalidating at least a portion of the read-only data in the local storage of the virtual computing instances; and synchronizing the new data as new read-only data in the local storage of the virtual computing instances.

The FIG. 2 process may also or alternatively include, responsive to determining that a first storage capacity of the local storage of the virtual computing instances is less than a second storage capacity of the persistent storage of the SDS system, instantiating one or more additional storage nodes for the SDS system, the one or more additional storage nodes being implemented using additional virtual computing instances having additional local storage. The FIG. 2 process may further or alternatively include, responsive to determining that IO activity of the SDS system exceeds a designated threshold, instantiating one or more additional virtual computing instances implementing additional storage nodes for the SDS system each comprising additional local storage.

In some embodiments, the FIG. 2 process includes analyzing IO activity of the SDS system to determine a given subset of the data stored in the storage system having at least a designated threshold likelihood of being the subject of one or more read requests from a given one of the two or more storage nodes of the SDS system, and storing the given subset of the data stored in the storage system as read-only data in a given portion of the local storage of a given one of the virtual computing instances implementing the given storage node. Storing the given subset of the data stored in the SDS system as read-only data in the given portion of the local storage associated with the given virtual computing instance implementing the given storage node may comprise relocating the given subset of the data from one or more other portions of the local storage of one or more other virtual computing instances implementing one or more other ones of the two or more storage nodes of the SDS system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
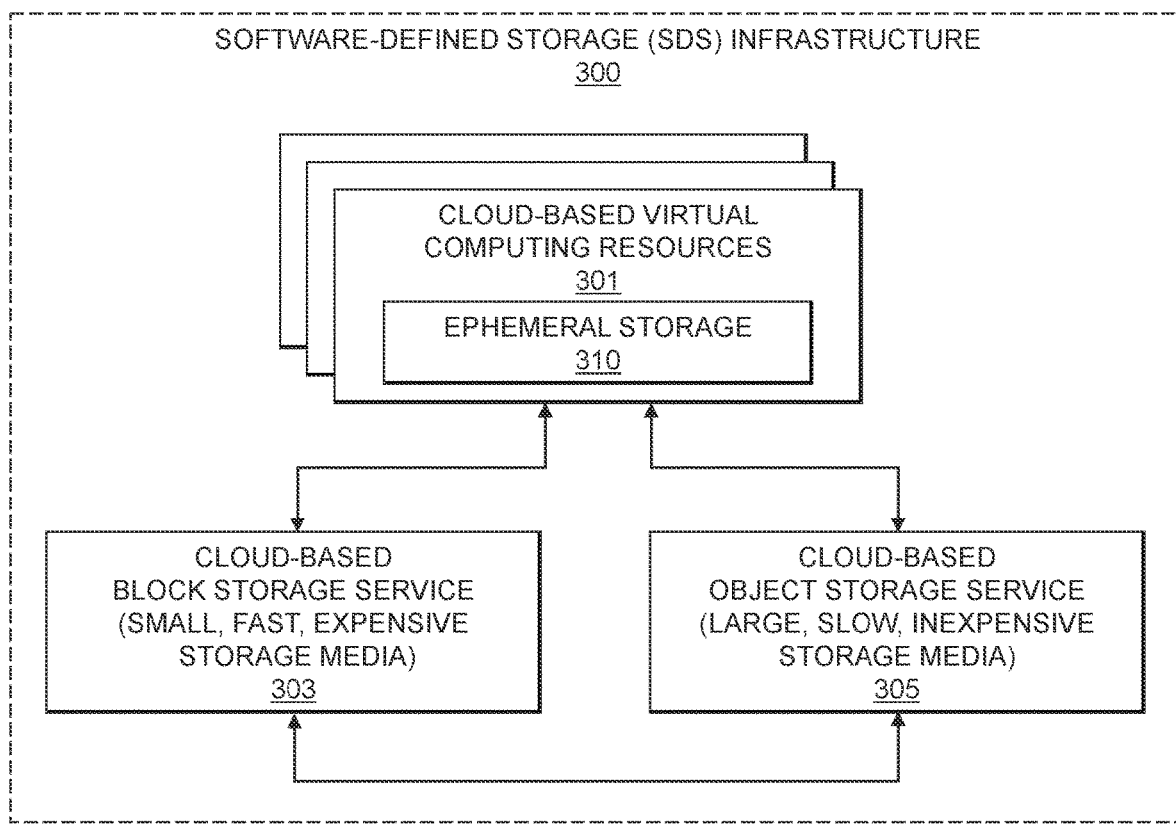
FIG. 3 shows a software-defined storage cloud infrastructure in an illustrative embodiment.

Illustrative embodiments provide technical solutions for optimizing or improving storage performance in information processing system utilizing SDS resources. In some embodiments, the information processing system is assumed to comprise SDS infrastructure including SDS cloud appliances. FIG. 3 shows an example of a SDS infrastructure 300, which includes various storage appliances having different cost and performance characteristics. In the FIG. 3 example, the SDS cloud infrastructure 300 includes cloud-based virtual computing resources 301 (e.g., implementing compute nodes 110 and/or storage nodes 140), a cloud-based block storage service 303, and a cloud-based object storage service 305. For ease of illustration, in the description below it is assumed that the cloud-based virtual computing resources 301 comprise cloud VMs, and are thus also referred to herein as cloud VMs 301. It should be appreciated, however, that other types of virtual computing resources such as containers may be used in other embodiments.

The cloud VMs 301 implement ephemeral storage 310 (e.g., in the form of local drives that are provided by default in VMs offered by a cloud service provider on which the cloud VMs 301 execute). As a particular example, the ephemeral storage 310 may include local drives in Amazon Elastic Compute Cloud (EC2) in an Amazon Web Services (AWS) cloud infrastructure. The ephemeral storage 310 (e.g., the local drives of the cloud VMs 301) can perform well, and has cost advantages in that such storage does not incur extra costs (e.g., as it is provided by default in the cloud VMs 301). While the ephemeral storage 310 can have a large storage capacity, it has drawbacks in that it is ephemeral—the data stored in the local drives of the cloud VMs 301 is lost when the cloud VMs 301 are shut down.

The cloud-based block storage service 303 implements networked block storage in the SDS infrastructure 300, and is an example of underlying storage which may be used to provide a write cache in the data storage system 130. As a particular example, the cloud-based block storage service 303 may include networked block storage such as Amazon Elastic Block Store (EBS) in AWS cloud infrastructure. The cloud-based block storage service 303 (e.g., which may be general purpose or have provisioned IOPS options) can also perform well, but has some additional network latency relative to the ephemeral storage 310 of the cloud VMs 301. The cloud-based block storage service 303 is persistent (e.g. it is not lost if the cloud VMs 301 are shut down). The cost of the cloud-based block storage service 303, however, can be significant (e.g., the costs may be based on the amount of data stored, such as per gigabyte (GB)). Further, the cloud-based block storage service 303 may have IOPS and bandwidth limits imposed by a cloud service provider. Generally, the cloud-based block storage service 303 provides small, fast and expensive storage media relative to the cloud-based object storage service 305.

The cloud-based object storage service 305 implements object storage in the SDS infrastructure 300, and is an example of the underlying storage which may be used to provide persistent backend storage in the data storage system 130. As a particular example, the cloud-based object storage service 305 may include object storage such as Amazon Simple Storage Service (S3) in AWS cloud infrastructure. The cloud-based object storage service 305 provides a relatively lower cost storage option, but its performance is also relatively slow and requires transformation of block storage into objects using object storage pools. Generally, the cloud-based object storage service 305 provides large, slow and inexpensive storage media relative to the cloud-based block storage service 303.

It should be noted that while particular examples of the ephemeral storage 310 in the cloud VMs 301 (e.g., Amazon EC2), cloud-based block storage service 303 (e.g., Amazon EBS), the cloud-based object storage service 305 (e.g., Amazon S3) are given in the context of an AWS cloud infrastructure, various other types of cloud infrastructure (e.g., Microsoft Azure, Google Cloud, etc.) may offer similar options with equivalent functionality and performance characteristics. Further, it is not required that all portions of the SDS infrastructure 300 be hosted on clouds of a same cloud service provider. For example, the cloud VMs 301 may be hosted on clouds of a first cloud service provider, while the cloud-based block storage service 303 and/or the cloud-based object storage service 305 may be hosted on clouds of one or more other cloud service providers.

The technical solutions described herein provide an architecture for processing I/O requests which can leverage different types of storage services that are available in a SDS cloud infrastructure (e.g., such as the SDS infrastructure 300) to provide an optimal price versus performance tradeoff while maintaining a highest level of availability and resilience.

In some embodiments, a first cloud storage service having a first performance level (e.g., the cloud-based block storage service 303 in the SDS infrastructure 300) is used for a write cache, and a second cloud storage service having a second performance level lower than the first performance level (e.g., the cloud-based object storage service 305 in the SDS infrastructure 300) is used for backend persistent storage where the full capacity of the address space of a storage appliance is stored. Local storage of virtual computing resources implementing compute and/or storage nodes of a storage system (e.g., the ephemeral storage 310 of the cloud VMs 301) is used as a storage "side car" which has a third performance level, with the third performance level being greater than the first and second performance levels of the first and second cloud storage services providing the write cache and backend persistent storage. At least a portion of the storage capacity of the storage appliance (e.g., most or all of the storage capacity) is capable of being stored in the storage side car acting as a read cache that maximizes performance for read IO requests.

Figure 4:
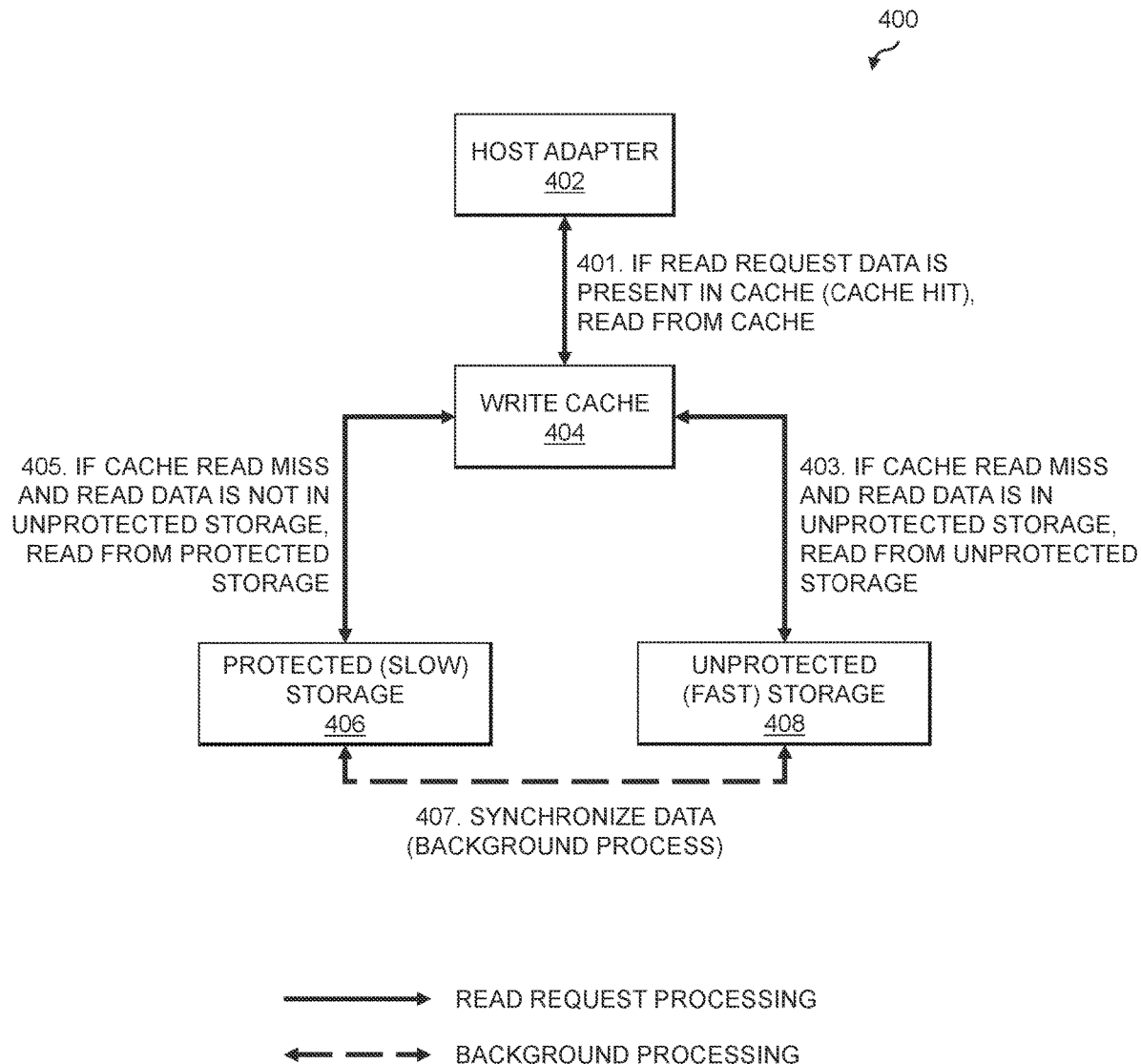
FIG. 4 shows a read request workflow in a storage array implementing a write cache, protected storage and unprotected storage in an illustrative embodiment.

FIG. 4 shows a storage read request workflow 400 in a storage array, including a host adapter 402, a write cache 404, protected storage 406, and unprotected storage 408. Here, the protected storage 406 is the primary storage, which is relatively slow compared with the unprotected storage 408. In some embodiments, the protected storage 406 includes Redundant Array of Independent Disks (RAID) protected HDDs (e.g., large, slow, expensive storage media) while the unprotected storage 408 includes SSDs (e.g., fast, expensive media). In the storage read request workflow 400, the host adapter 402 submits read requests first to a write cache 404. In step 401, if read request data is present in the write cache 404 (e.g., a cache hit), such data is read from the write cache 404. In step 403, if there is a cache read miss and the read data is in the unprotected storage 408, the data is read from the unprotected storage 408. In step 405, if there is a cache read miss and read data is not in the unprotected storage 408, the data is read from the protected storage 406. The protected storage 406 synchronizes stored data with the unprotected storage 408 as a background process in step 407.

In some embodiments, a storage "side car" is used which leverages the local drive capacity that is already paid for or included as part of virtual computing resources providing compute and/or storage nodes of a storage system (e.g., the cloud VMs 301 of the SDS infrastructure 300). This local drive capacity is advantageously very low latency, and can provide large capacity. If one of the virtual computing resources is shut down, contents in its associated local drive will be lost (e.g., the local drive provides ephemeral storage). Until a new instance of the virtual computing resource is spun up elsewhere and re-populated with data stored in backend persistent storage (e.g., the cloud-based object storage service 305 in the SDS infrastructure 300), read IO requests may be served from the backend persistent storage or, potentially, a write cache (e.g., the cloud-based block storage service 303 in the SDS infrastructure 300).

In some cases, it is assumed that the full storage capacity of the backend persistent storage will fit into the storage side car provided by local drives associated with virtual computing resources implementing compute and/or storage nodes of a storage system. This may be facilitated in that protection is not required for the data stored in the storage side car (e.g., the local drives associated with the virtual computing resources implementing compute and/or storage nodes of the storage system). When the full storage capacity is made available in the storage side car, almost all read requests may be served from the storage side car. In some cases, almost 100% of read requests may be served by the storage side car storage if invalidation of data in the storage side car (e.g., in response to write requests) is replaced with synchronous update of the storage side car (e.g., from a write cache to the storage side car).

Where the full storage capacity of the backend persistent storage does not fit into the storage side car storage, additional algorithms can be used to populate data which is most likely to be accessed in the storage side car. In this case, the storage side car performs like a large capacity read cache. As another option when the full storage capacity of the backend persistent storage does not fit into the storage side car, additional virtual computing resources (e.g., cloud VMs) can be spun up to provide the needed local drive capacity.

This can be done when a storage array is set up, or in real time as capacity of the storage array is increased. The additional virtual computing resources advantageously provide not only additional local drive capacity for the storage side car, but also additional IOPS processing capability due to the addition of the new virtual computing resources. The real-time addition of additional virtual computing resources may, in some cases, be done temporarily depending on performance demands. For example, when performance demand increases (e.g., there is need for more compute and/or storage nodes to meet IOPS requirements) or when there is a need for lower latency (e.g., to meet latency-based service level objectives (SLOs)), additional virtual computing resources (e.g., cloud VMs) may be spun up. Conversely, when performance demand decreases, one or more virtual computing resources (e.g., cloud VMs) may be shut down. Additional performance optimizations and improvements may be provided by placing data in the local drive of a particular virtual computing resource (e.g., a particular cloud VM) which is processing a read request directed to that data. This localization will avoid network hops across compute and/or storage nodes, and will gain additional latency reductions.

Figure 5:
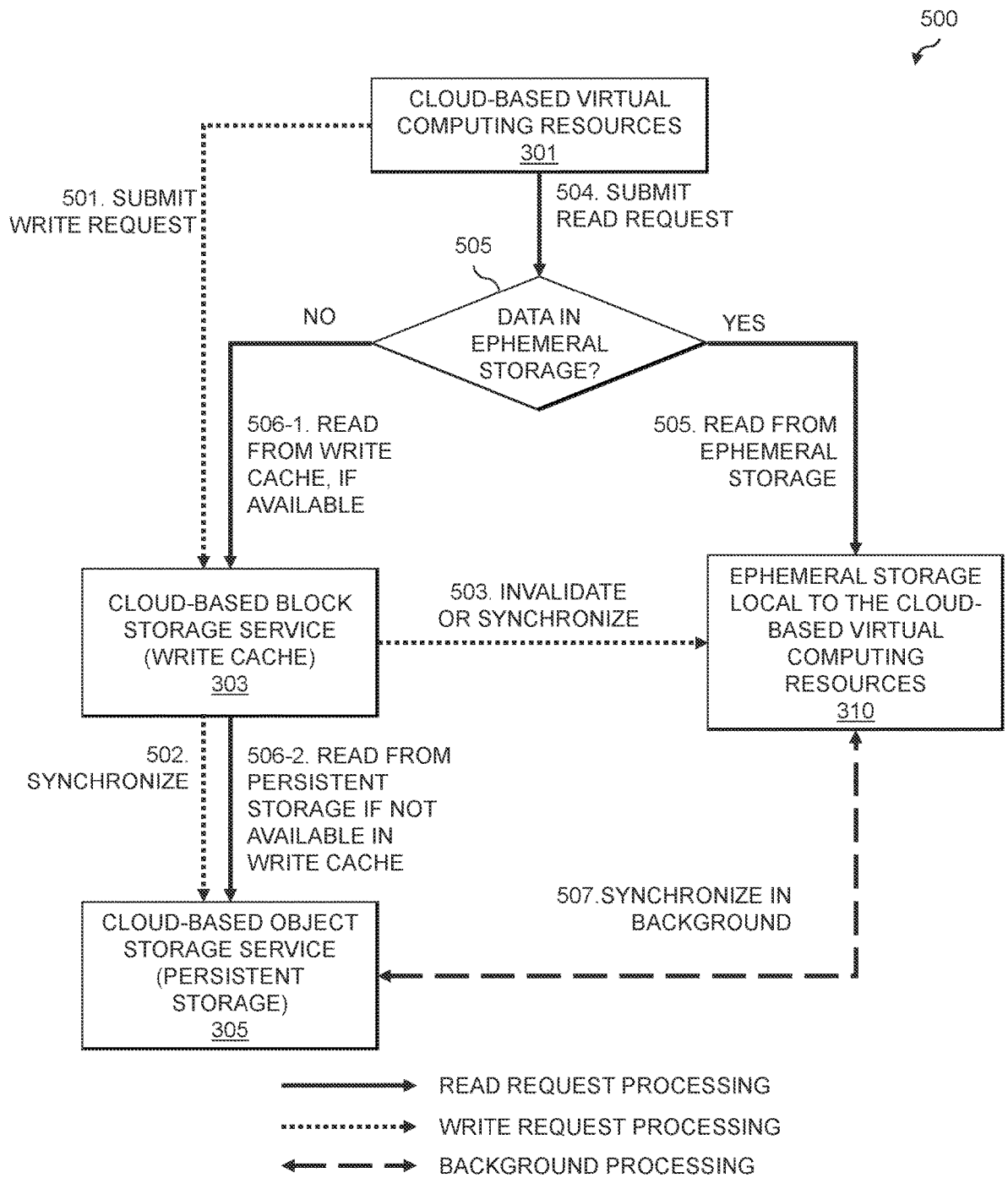
FIG. 5 shows write and read request workflows in a storage system implementing a write cache, ephemeral storage and persistent storage in an illustrative embodiment.

FIG. 5 shows storage write and read request workflows 500 in the SDS infrastructure 300. More particularly, FIG. 5 shows the cloud-based virtual computing resources 301 (e.g., cloud VMs), ephemeral storage 310 on the cloud-based virtual computing resources 301, the cloud-based block storage service 303 implementing a write cache, and a cloud-based object storage service 305 implementing persistent storage. In step 501, a write request is submitted by the cloud-based virtual computing resources 301 to the write cache of the cloud-based block storage service 303. The new data will be written in the write cache, and is synchronized to the persistent storage of the cloud-based object storage service 305 in step 502. In step 503, the write cache of the cloud-based block storage service 303 invalidates or synchronizes the newly written data in the ephemeral storage 310 that is local to the cloud-based virtual computing resources 301.

In step 504, a read request is submitted from the cloud-based virtual computing resources 301. In step 505, a determination is made as to whether the data in the read request is available in the ephemeral storage 310 local to the cloud-based virtual computing resources 301. If the result of the step 505 determination is yes, the data is read from the ephemeral storage 310 local to the cloud-based virtual computing resources 301 in step 506. If the result of the step 505 determination is no, the data is read from the write cache implemented by the cloud-based block storage service 303 in step 506-1, or from the persistent storage implemented by the cloud-based object storage service 305 in step 506-2. In some embodiments, data is read from the write cache if available and is only read from the persistent storage if the data is not available in the write cache (e.g., as the write cache is assumed to provide a higher level of performance than the persistent storage). In other embodiments, step 506-1 may be skipped and the data may be read directly from the persistent storage if the result of the step 505 determination is no. In step 507, data is synchronized in a background process between the persistent storage in the cloud-based object storage service 305 and the ephemeral storage 310 local to the cloud-based virtual computing resources 301.

The use of a storage side car in the technical solutions described herein provides various technical advantages in meeting cost, performance and availability requirements. For example, an approach which uses only a cloud-based block storage service (e.g., EBS) is a very expensive solution. An approach which uses the cloud-based block storage service for a write cache and puts persistent data in a cloud-based object storage service (e.g., S3) would have long read IO latency. Another option is to develop a read cache, and to put the read cache in the cloud-based block storage service. This may be effective from a performance perspective, but the read cache size would be limited due to cost requirements. Still another option is to run an entire SDS instance in ephemeral storage (e.g., local drives of cloud VMs providing storage nodes of a storage system). This may achieve performance objectives, but will not meet availability requirements in the case where one or more of the cloud VM instances fails and loses its ephemeral data. A variation of this approach would be to snapshot the SDS instance in the ephemeral storage to cloud-based object storage in regular intervals. While this provides some data protection, there will always be a lag between the latest update and the last snapshot and thus the Recovery Point Objective (RPO) will never be zero.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 6:
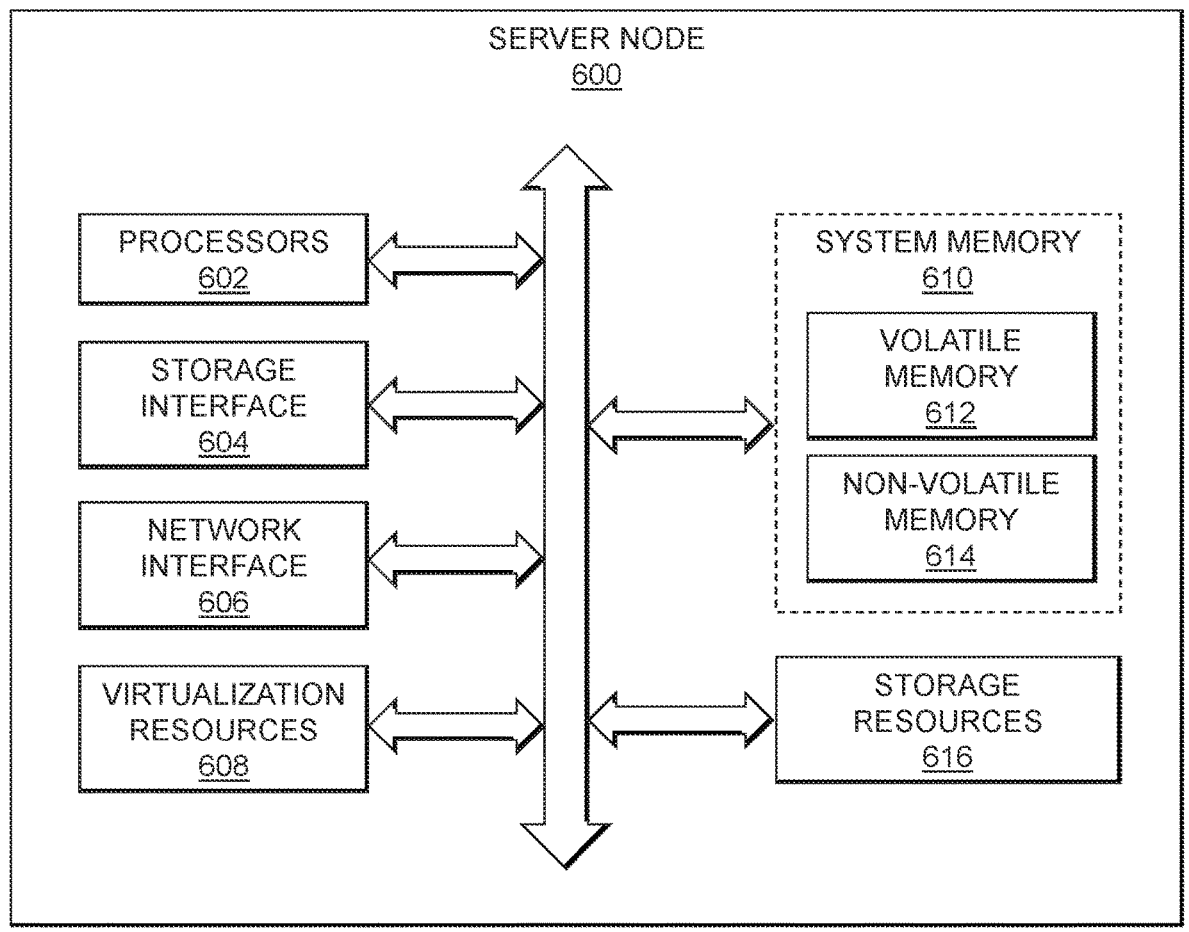
FIG. 6 schematically illustrates a framework of a server node for implementing a storage node which hosts logic for input-output processing utilizing software-defined storage resources in an illustrative embodiment.

FIG. 6 schematically illustrates a framework of a server node (or more generally, a computing node) for hosting logic for IO processing utilizing SDS resources according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more service or functions which are hosted by the server node 600. For example, the virtualization resources 608 can be configured to implement the various modules and functionalities of the volume tiering logic as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the IO request processing logic 117 and the data caching and synchronization logic 119, comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
monitoring input-output activity of a software-defined storage system comprising (i) two or more storage nodes implemented at least in part as respective virtual computing instances having local ephemeral storage and providing processing resources for handling at least a designated amount of input-output operations per second, (ii) a write cache external to the two or more storage nodes, and (ii) persistent storage external to the two or more storage nodes, wherein the write cache is implemented using a first type of cloud-based storage resources providing a first performance level, the persistent storage is implemented using a second type of cloud-based storage resources providing a second performance level, and the local ephemeral storage of the virtual computing instances is implemented using a third type of cloud-based storage resources providing a third performance level;
dynamically adjusting a number of the two or more storage nodes of the software-defined storage system based at least in part on the monitored input-output activity and at least the designated amount of input-output operations per second handled by the processing resources of the virtual computing instances;
receiving, from one of the two or more storage nodes of the software-defined storage system, a read input-output request to read a given portion of data;
determining whether the given portion of data is part of one or more portions of the data stored in the persistent storage of the software-defined storage system that are also stored as read-only data in the local ephemeral storage of the virtual computing instances;
responsive to determining that the given portion of data is part of the one or more portions of the data stored in the persistent storage of the software-defined storage system that are also stored as read-only data in the local ephemeral storage of the virtual computing instances, reading the given portion of data from the local ephemeral storage of the virtual computing instances; and
responsive to determining that the given portion of data is not part of the one or more portions of the data stored in the persistent storage of the software-defined storage system that are also stored as read-only data in the local ephemeral storage of the virtual computing instances, reading the given portion of data from at least one of the write cache and the persistent storage of the software-defined storage system.

2. The apparatus of claim 1 wherein at least one of the virtual computing instances comprises at least one of a virtual machine and a software container.

3. The apparatus of claim 1 wherein the local ephemeral storage of the virtual computing instances does not persist when the virtual computing instances are shut down.

4. The apparatus of claim 1 wherein the second performance level is lower than the first performance level.

5. The apparatus of claim 4 wherein the third performance level is higher than the first and second performance levels.

6. The apparatus of claim 1 wherein:
the first type of cloud-based storage resources, used to implement the write cache, comprises cloud-based block storage; and
the second type of cloud-based storage resources, used to implement the persistent storage, comprises cloud-based object storage.

7. The apparatus of claim 1 wherein the third type of cloud-based storage resources, used to implement the local ephemeral storage of the virtual computing instances, comprises cloud-based block storage with a lower latency than cloud-based block storage used for implementing the write cache.

8. The apparatus of claim 1 wherein the at least one processing device is further configured to perform the step of synchronizing, in a background process, the one or more portions of the data stored in the persistent storage of the software-defined storage system with the read-only data in the local ephemeral storage of the virtual computing instances.

9. The apparatus of claim 1 wherein the at least one processing device is further configured to perform the steps of:
receiving, from one of the two or more storage nodes of the software-defined storage system, a write input-output request to write new data; and
responsive to writing the new data to the write cache of the software-defined storage system, invalidating at least a portion of the read-only data in the local ephemeral storage of the virtual computing instances.

10. The apparatus of claim 1 wherein the at least one processing device is further configured to perform the steps of:
receiving, from one of the two or more storage nodes of the software-defined storage system, a write input-output request to write new data; and
responsive to writing the new data to the write cache of the software-defined storage system, synchronizing the new data as new read-only data in the local ephemeral storage of the virtual computing instances.

11. The apparatus of claim 1 wherein the at least one processing device is further configured to perform the step of, responsive to determining that a first storage capacity of the local ephemeral storage of the virtual computing instances is less than a second storage capacity of the persistent storage of the software-defined storage system, instantiating one or more additional storage nodes for the software-defined storage system, the one or more additional storage nodes being implemented using additional virtual computing instances having additional local ephemeral storage implemented using the third type of cloud-based storage resources.

12. The apparatus of claim 1 wherein the at least one processing device is further configured to perform the step of, responsive to determining that the monitored input-output activity of the software-defined storage system exceeds a designated threshold, instantiating one or more additional virtual computing instances implementing additional storage nodes for the software-defined storage system each comprising additional local ephemeral storage implemented using the third type of cloud-based storage resources.

13. The apparatus of claim 1 wherein the at least one processing device is further configured to perform the steps of:
analyzing the monitored input-output activity of the software-defined storage system to determine a given subset of the data stored in the software-defined storage system having at least a designated threshold likelihood of being a subject of one or more read requests from a given one of the two or more storage nodes of the software-defined storage system; and storing the given subset of the data stored in the software-defined storage system as read-only data in a given portion of the local ephemeral storage of a given one of the virtual computing instances implementing the given storage node.

14. The apparatus of claim 13 wherein storing the given subset of the data stored in the software-defined storage system as read-only data in the given portion of the local ephemeral storage associated with the given virtual computing instance implementing the given storage node comprises relocating the given subset of the data from one or more other portions of the local ephemeral storage of one or more other virtual computing instances implementing one or more other ones of the two or more storage nodes of the software-defined storage system.

15. A computer program product comprising a non-transitory processor-readable storage medium having stored therein program code of one or more software programs, wherein the program code when executed by at least one processing device causes the at least one processing device to perform steps of:

monitoring input-output activity of a software-defined storage system comprising (i) two or more storage nodes implemented at least in part as respective virtual computing instances having local ephemeral storage and providing processing resources for handling at least a designated amount of input-output operations per second, (ii) a write cache external to the two or more storage nodes, and (ii) persistent storage external to the two or more storage nodes, wherein the write cache is implemented using a first type of cloud-based storage resources providing a first performance level, the persistent storage is implemented using a second type of cloud-based storage resources providing a second performance level, and the local ephemeral storage of the virtual computing instances is implemented using a third type of cloud-based storage resources providing a third performance level;

dynamically adjusting a number of the two or more storage nodes of the software-defined storage system based at least in part on the monitored input-output activity and at least the designated amount of input-output operations per second handled by the processing resources of the virtual computing instances;

receiving, from one of the two or more storage nodes of the software-defined storage system, a read input-output request to read a given portion of data;

determining whether the given portion of data is part of one or more portions of the data stored in the persistent storage of the software-defined storage system that are also stored as read-only data in the local ephemeral storage of the virtual computing instances;

responsive to determining that the given portion of data is part of the one or more portions of the data stored in the persistent storage of the software-defined storage system that are also stored as read-only data in the local ephemeral storage of the virtual computing instances, reading the given portion of data from the local ephemeral storage of the virtual computing instances; and responsive to determining that the given portion of data is not part of the one or more portions of the data stored in the persistent storage of the software-defined storage system that are also stored as read-only data in the local ephemeral storage of the virtual computing instances, reading the given portion of data from at least one of the write cache and the persistent storage of the software-defined storage system.

16. The computer program product of claim 15 wherein:
the first type of cloud-based storage resources, used to implement the write cache, comprises cloud-based block storage; and
the second type of cloud-based storage resources, used to implement the persistent storage, comprises cloud-based object storage.

17. The computer program product of claim 15 wherein the third type of cloud-based storage resources, used to implement the local ephemeral storage of the virtual computing instances, comprises cloud-based block storage with a lower latency than cloud-based block storage used for implementing the write cache.

18. A method comprising:

monitoring input-output activity of a software-defined storage system comprising (i) two or more storage nodes implemented at least in part as respective virtual computing instances having local ephemeral storage and providing processing resources for handling at least a designated amount of input-output operations per second, (ii) a write cache external to the two or more storage nodes, and (ii) persistent storage external to the two or more storage nodes, wherein the write cache is implemented using a first type of cloud-based storage resources providing a first performance level, the persistent storage is implemented using a second type of cloud-based storage resources providing a second performance level, and the local ephemeral storage of the virtual computing instances is implemented using a third type of cloud-based storage resources providing a third performance level;

dynamically adjusting a number of the two or more storage nodes of the software-defined storage system based at least in part on the monitored input-output activity and at least the designated amount of input-output operations per second handled by the processing resources of the virtual computing instances;

receiving, from one of the two or more storage nodes of the software-defined storage system, a read input-output request to read a given portion of data;

determining whether the given portion of data is part of one or more portions of the data stored in the persistent storage of the software-defined storage system that are also stored as read-only data in the local ephemeral storage of the virtual computing instances;

responsive to determining that the given portion of data is part of the one or more portions of the data stored in the persistent storage of the software-defined storage system that are also stored as read-only data in the local ephemeral storage of the virtual computing instances, reading the given portion of data from the local ephemeral storage of the virtual computing instances; and responsive to determining that the given portion of data is not part of the one or more portions of the data stored in the persistent storage of the software-defined storage system that are also stored as read-only data in the local ephemeral storage of the virtual computing instances, reading the given portion of data from at least one of the write cache and the persistent storage of the software-defined storage system;

wherein the method is performed by at least one processing device comprising a processor coupled to a memory.

19. The method of claim 18 wherein:
- the first type of cloud-based storage resources, used to implement the write cache, comprises cloud-based block storage; and
- the second type of cloud-based storage resources, used to implement the persistent storage, comprises cloud-based object storage.

20. The method of claim 18 wherein the third type of cloud-based storage resources, used to implement the local ephemeral storage of the virtual computing instances, comprises cloud-based block storage with a lower latency than cloud-based block storage used for implementing the write cache.

* * * * *